US012051874B2

(12) United States Patent
Johnson et al.

(10) Patent No.: US 12,051,874 B2
(45) **Date of Patent: *Jul. 30, 2024**

(54) MAGNETIC LATCHING CONNECTOR

(71) Applicant: Onanon, Inc., Milpitas, CA (US)

(72) Inventors: Dennis J. Johnson, Milpitas, CA (US); Katherine H. Hoose, San Jose, CA (US)

(73) Assignee: Onanon, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,796

(22) Filed: Dec. 22, 2022

(65) Prior Publication Data

US 2023/0125387 A1 Apr. 27, 2023

Related U.S. Application Data

(63) Continuation of application No. 17/849,921, filed on Jun. 27, 2022, now Pat. No. 11,539,162, which is a (Continued)

(51) Int. Cl.

| | |
|---|---|
| ***H01R 13/62*** | (2006.01) |
| ***H01R 13/506*** | (2006.01) |
| ***H01R 13/58*** | (2006.01) |
| ***H01R 13/64*** | (2006.01) |
| ***H01R 13/645*** | (2006.01) |
| ***H01R 13/73*** | (2006.01) |

(Continued)

(52) U.S. Cl.

CPC ....... *H01R 13/6205* (2013.01); *H01R 13/506* (2013.01); *H01R 13/582* (2013.01); *H01R 13/64* (2013.01); *H01R 13/6456* (2013.01); *H01R 13/73* (2013.01); *H01R 24/86* (2013.01); *H01R 27/02* (2013.01); *H01R 2107/00* (2013.01); *H01R 2201/12* (2013.01)

(58) Field of Classification Search

CPC ....................... H01R 13/6205; H01R 13/6456; H01R 13/64; H01R 11/30; H01R 2107/00; H01R 24/86; H01R 27/02; G02B 6/3886

See application file for complete search history.

(56) References Cited

U.S. PATENT DOCUMENTS

| | | | |
|---|---|---|---|
| 3,808,577 | A | 4/1974 | Mathauser |
| 4,874,316 | A | 10/1989 | Kamon |

(Continued)

*Primary Examiner* — Vanessa Girardi

(74) *Attorney, Agent, or Firm* — Neustel Law Offices

(57) ABSTRACT

A magnetic latching connector for making electrical connections between cables, electrical power and signal sources, equipment and the like in a variety of medical and other applications in which it is desired to have the connection maintained with a predetermined amount of magnetic attractive force. The magnetic latching connector generally includes male and female connector components. The male and female connector components comprise male and female couplings and male and female coupling housings. The male and female coupling housings enclose electrical connections between the male and female couplings and electrical cables. Recessed within the male and female couplings are electrically conductive pins and sockets and male and female magnetic latching elements. When the male and female connector components are coupled, the pins and sockets provide electrical connections and the recessed magnetic latching elements provide a predetermined magnetic attraction force to maintain the connections.

20 Claims, 9 Drawing Sheets

Related U.S. Application Data continuation of application No. 17/246,957, filed on May 3, 2021, now Pat. No. 11,374,353, which is a continuation of application No. 16/658,586, filed on Oct. 21, 2019, now Pat. No. 10,998,673, which is a continuation of application No. 15/988,076, filed on May 24, 2018, now Pat. No. 10,454,208, which is a continuation of application No. 15/782,997, filed on Oct. 13, 2017, now Pat. No. 9,985,384.

(51) Int. Cl.

| | |
|---|---|
| ***H01R 24/86*** | (2011.01) |
| ***H01R 27/02*** | (2006.01) |
| *H01R 107/00* | (2006.01) |

(56) References Cited

U.S. PATENT DOCUMENTS

| | | | |
|---|---|---|---|
| 5,401,175 | A | 3/1995 | Guimond |
| 6,623,276 | B2 | 9/2003 | Ferrerfabrega |
| 7,311,526 | B2 | 12/2007 | Rohrbach |
| 8,348,678 | B2 | 1/2013 | Hardisty |
| 9,531,118 | B2 | 12/2016 | Byrne |
| 9,985,384 | B1 | 5/2018 | Johnson |
| 11,165,196 | B2 | 11/2021 | Yonnet |
| 2018/0358749 | A1 | 12/2018 | Byrne |

MAGNETIC LATCHING CONNECTOR

CROSS REFERENCE TO RELATED APPLICATIONS

The present application is a continuation of U.S. application Ser. No. 17/849,921 filed on Jun. 27, 2022 which issues as U.S. Pat. No. 11,539,162 on Dec. 27, 2022, which is a continuation of U.S. application Ser. No. 17/246,957 filed on May 3, 2021 now issued as U.S. Pat. No. 11,374, 353, which is a continuation of U.S. application Ser. No. 16/658,586 filed on Oct. 21, 2019 now issued as U.S. Pat. No. 10,998,673, which is a continuation of U.S. application Ser. No. 15/988,076 filed on May 24, 2018 now issued as U.S. Pat. No. 10,454,208, which is a continuation of U.S. application Ser. No. 15/782,997 filed on Oct. 13, 2017 now issued as U.S. Pat. No. 9,985,384. Each of the aforementioned patent, applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a magnetic latching connector for making electrical connections. More particularly, example embodiments relate to a magnetic latching connector of the type having multiple male pins and female sockets adapted for making electrical connections in a variety of medical and other applications.

Related Art

Any discussion of the related art throughout the specification should in no way be considered as an admission that such related art is widely known or forms part of common general knowledge in the field.

Electrical connectors for connecting power, data and/or other electrical signals between a source and devices or equipment are well known and ubiquitous. More particularly, connectors that simultaneously provide multiple electrical connections using coupled male and female components are well known. For example, some such connectors employ a plurality of electrically conductive pins in a male component and a corresponding plurality of electrically conductive sockets or receptacles in a female component. Typically, although not necessarily, an insulated cable or cord carries a plurality of power and/or signal wires, each of which may also be insulated, from a source to the non-connecting or back side of either a male or female component, where the individual wires are electrically connected to pins or receptacles. Similarly, a corresponding plurality of power and/or signal wires are electrically connected to corresponding pins or receptacles on the back or non-connecting side of the corresponding male or female component, and an insulated cable or cord carries the plurality of power and/or signal wires to the device or equipment to be electrically connected with the source. Multiple electrical connections between a source and a device or piece of equipment can then be made substantially simultaneously by coupling the male and female components such that the pins of the male component are inserted into and make electrical contact with the corresponding sockets or receptacles of the female component. Numerous variations of multi-pin connectors are produced by companies like Winchester Electronics, Amphenol, Molex, and others. One multi-pin connector having spring-loaded pins is known as a "Pogo"® connector and is produced by Everett Charles Technologies.

Many such connectors exhibit certain problems and shortcomings. For example, misalignment of the pins and corresponding sockets can result in damage to the pins and/or sockets, resulting in failure of the electrical connections, and even permanent damage to the connector. Connectors with large numbers of pins and corresponding sockets and/or where the pins and corresponding sockets are small and delicate are particularly prone to this problem. One way this problem can arise is when the male and female components are decoupled forcefully and out of proper alignment. Such decoupling may occur either intentionally through carelessness, or accidentally, such as from someone tripping over a cable or cord. Because the pins of the male component are designed to be directly inserted into and removed from the sockets of the female component in the axial direction of the pins and sockets, rather than at an angle, removal of the pins at an angle can cause bending and misalignment of the pins as well as damage to the sockets. Once the pins become bent and/or misaligned with the sockets, a subsequent attempt to couple the male and female components can cause the pins to become further bent or even broken, resulting in failure to make the intended electrical connections, and potentially permanent damage to the connector.

Another problem with the known multi-pin connectors is that the electrical connections between individual pins and corresponding sockets can become loosened. For example, over time and after multiple insertions and retractions, the pins, the sockets, or both can wear, resulting in the physical connection between pins and sockets becoming loosened. Alternatively, or in addition, damage to either pins or sockets can result in loosened connections. A loosened physical connection can manifest itself as an intermittent electrical connection, particularly in instances in which the connector is subject to vibration or other relative movement between the male and female components.

One potential solution to the foregoing problems has been to provide one or more semi-permanent fasteners on the male and female connectors. For example, some multi-pin connectors, such as certain D-sub connectors, have been fitted with a threaded fastener, such as a machine screw, on an exterior stub or flange of one of the male and female components, and a corresponding threaded socket on an exterior stub or flange of the other component. With the corresponding male and female components coupled, the fasteners are engaged to hold the connectors together semi-permanently. Other similar approaches have included providing the male and female components with bayonet-type fasteners, snap fittings, and the like.

However, the foregoing approaches create additional problems. In some applications, it may be desirable for the corresponding male and female connectors to be securely coupled so as to maintain a reliable electrical connection but not to be fixedly coupled, even temporarily and reversibly. For example, in certain medical and other environments it may be desirable for the corresponding male and female components to maintain a secure and reliable electrical connection but to readily separate if a certain amount of force is applied. Thus, for example, if a patient or visitor were to trip over or pull a cable or wire connected to medical monitoring or treatment equipment, it would be more desirable for the male and female components to separate than for a cable or cord to be forcefully ripped from the equipment, which could potentially cause substantial and costly damage to the equipment, or even cause the equipment to fall or be upended and possibly injure a patient or visitor.

One approach tried in the past with respect to certain Pogo-type connectors has been to incorporate magnetic material in the exposed opposing faces of corresponding male and female components. In this approach, the coupling of the male and female components is supposedly aided by the attraction force of the magnetic materials without the use of permanent or semi-permanent fasteners as described above. However, this approach also has a number of potential problems. First, the pins in the male Pogo connector component are spring biased to help make secure contact with corresponding receptacles in the female Pogo connector component. The spring force is directed outwardly from the male connector in the direction of the female connector, which is opposite to the attraction force of the magnets. Some embodiments therefore may require a substantial amount of magnetic force to overcome the opposing force of the springs. An insufficient magnetic attraction force could be overcome by the opposing force of the springs and result in the same problems as if no magnets were present. In contrast, a magnetic attraction force greater than necessary to overcome the spring force could result in the connector failing to decouple, and failing to prevent a cable or cord from being forcibly removed from equipment, potentially resulting in damage to the equipment and/or injury, as described above. Second, incorporating magnetic materials that produce a magnetic attraction force strong enough to overcome the spring force could create a magnetic field strong enough to interfere with electrical signals transiting the connector. This is highly undesirable in some applications, such as some medical applications, where the affected signals could represent critical data, such as EKG readings or the like. Third, because the magnetic materials are exposed to the surrounding environment when the male and female components are not coupled, the magnetic materials could be damaged or could become covered or coated with a substance that reduces the magnetic attraction force and thus prevents the male and female components from coupling securely.

There thus remains a need in a variety of medical and other applications for a multi-pin electrical connector in which male and female connector components may be securely coupled to maintain reliable electrical connections without the use of permanent or semi-permanent fasteners. There also remains a need for such a connector in which the male and female connectors are operative to decouple in response to a certain amount of force to prevent potential damage to equipment to which the electrical connector is coupling cables or cords and/or injury. There also remains a need for such a connector which can employ magnetic latching without the problems of the known magnetic latching Pogo-type connectors.

The example embodiments of a magnetic latching connector disclosed herein are directed to addressing the foregoing needs and the foregoing and other problems of the prior art.

SUMMARY

An example embodiment is directed to a magnetic latching connector. The example magnetic latching connector includes a male connector component and a corresponding female connector component adapted to be coupled to make a plurality of electrical connections. The male connector component comprises a male coupling having a plurality of outwardly extending electrically conductive pins and an outwardly extending male magnetic latching element recessed within the male coupling. The female connector component comprises a female coupling having a plurality of electrically conductive sockets adapted to receive the pins of the male coupling and a recessed receptacle containing a female magnetic latching element adapted to receive the male magnetic latching element. The male and female magnetic latching elements provide a predetermined attractive magnetic force to assist maintaining the male and female in a coupled state. The male coupling and female coupling each have a back end adapted to make electrical connections with multiple wires of respective electrical cables. The male and female connector components also comprise housings adapted to receive and enclose the back end and wire connections of the male and female couplings respectively.

Example embodiments incorporate various arrangements of pins, sockets, and magnetic latching elements. Example embodiments include keying features that limit male and female connector components to coupling in only one predetermined orientation. An example embodiment incorporates a connector component adapted for mounting in a cabinet or body of a device or piece of equipment.

There has thus been outlined, rather broadly, some of the example embodiments of the magnetic latching connector in order that the detailed description thereof may be better understood, and in order that the present contribution to the art may be better appreciated. There are additional embodiments of the magnetic latching connector that will be described hereinafter and that will form the subject matter of the claims appended hereto. In this respect, before explaining at least one embodiment of the magnetic latching connector in detail, it is to be understood that the magnetic latching connector is not limited in its application to the details of construction or to the arrangements of the components set forth in the following description or illustrated in the drawings. The magnetic latching connector is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

An example magnetic latching connector generally comprises a male connector component and a corresponding female connector component. The male and female connector components are adapted to be physically coupled to simultaneously make multiple electrical connections. The male connector component comprises a male coupling having a plurality of outwardly extending electrically conductive pins and an outwardly extending male magnetic latching element recessed within the male coupling. The female connector component comprises a female coupling having a plurality of electrically conductive sockets adapted to receive the pins of the male coupling and a recessed receptacle containing a female magnetic latching element adapted to receive the male magnetic latching element. The male and female magnetic latching elements are selected to provide a predetermined attractive magnetic force to assist maintaining the male and female in a coupled state. The male coupling and female coupling each have a back end adapted to make electrical connections with multiple wires of respective cables or cords. The male and female connector components also comprise male and female coupling housings adapted to receive and enclose the back end and wire connections of the male coupling and female coupling respectively.

B. Connector Components

Figure 1:
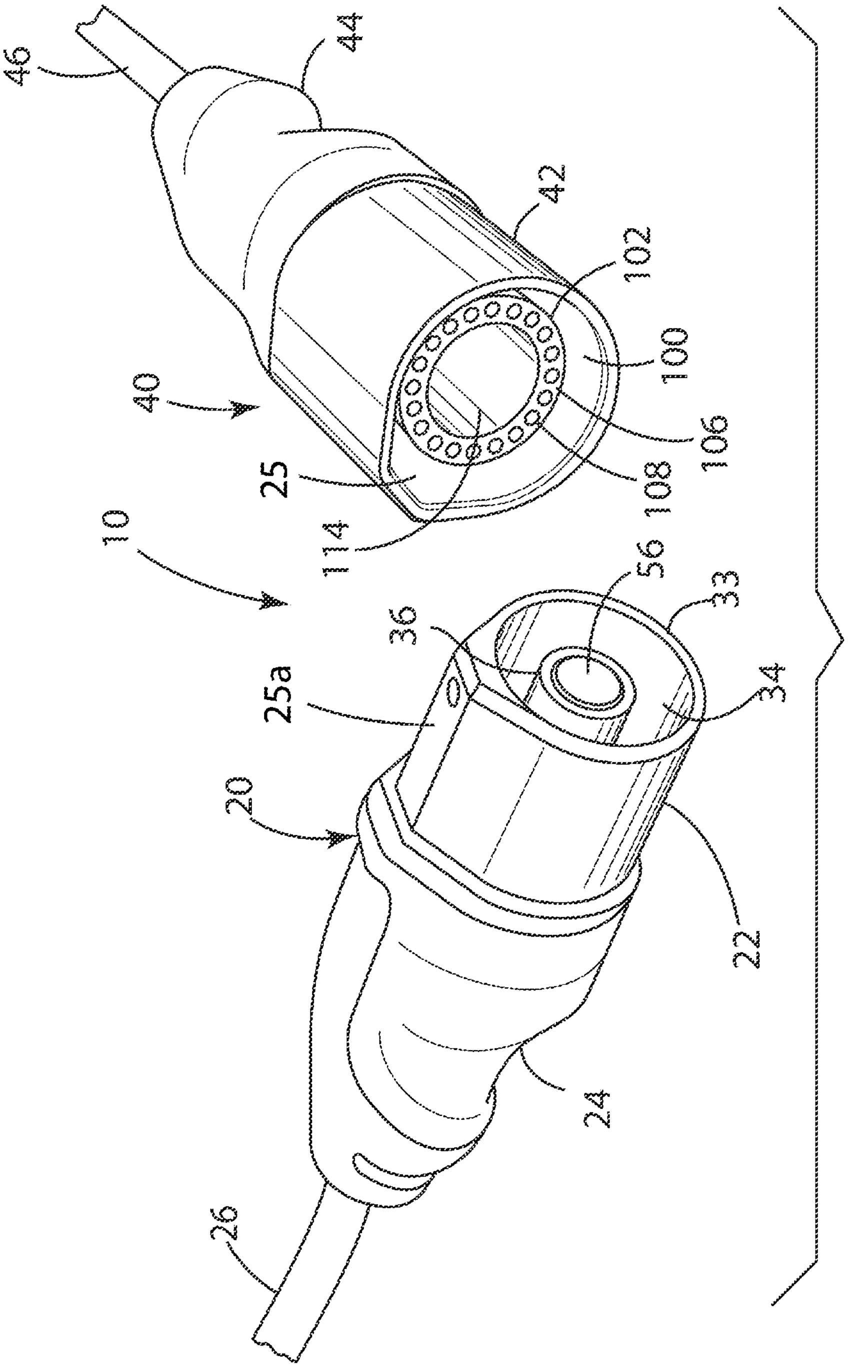
FIG. 1 is a perspective view of a magnetic latching connector in accordance with an example embodiment.
Figure 2:
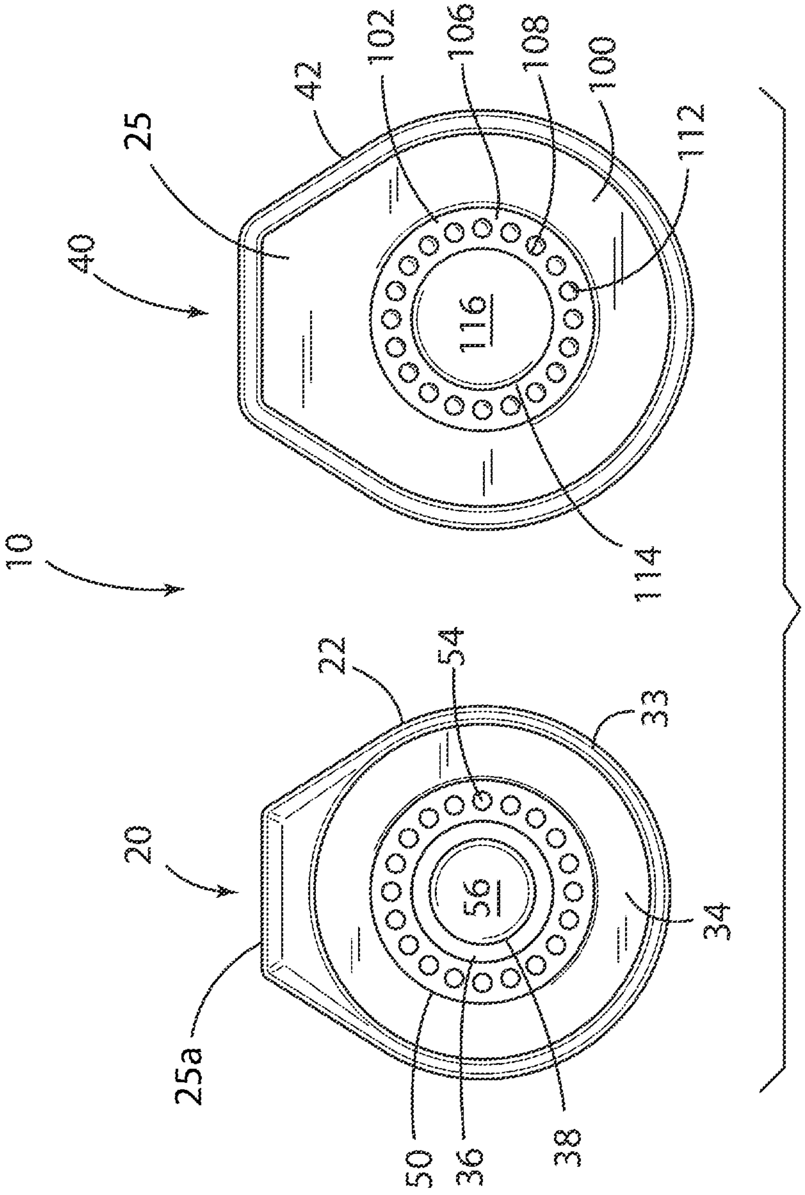
FIG. 2 is a front end view of a magnetic latching connector in accordance with an example embodiment.

Referring to FIGS. 1-2, an example magnetic latching connector 10 includes a male connector component 20 and a female connector component 40. The male connector component 20 in turn includes a male coupling 22 and male coupling housing 24, which receives an end of an electrical cable 26. The female connector component 40 in turn includes a female coupling 42 and female coupling housing 44, which receives an end of an electrical cable 46. The opposite ends (not shown) of the cables 26, 46 in turn may be connected to a source of electrical power and/or signals, a piece of equipment or a device that receives electrical power and/or signals, another connector adapted to be connected to yet another cable, source, or piece of equipment, or to an intermediate device, such as a switch or multiplexer.

The male and female couplings 22, 42 and the male and female coupling housings 24, 44 are preferably constructed of conventional electrically non-conductive insulating material. Many suitable materials, such as a variety of moldable plastics, are known to persons skilled in the art and are suitable for use. The male and female couplings and the male and female coupling housings may be formed by a conventional molding process, machining process, or a combination of both. Again, many such processes are known to persons skilled in the art and will be found suitable for this purpose. The male and female couplings 22, 42, and the corresponding male and female housings 24, 44 may be separately molded and then connected together mechanically as described below. Alternatively, the male and female housings 24, 44 may be over-molded on the male and female couplings 22, 42, and electrical cables 26, 46.

The male and female couplings 22, 42 are preferably formed in complimentary shapes to facilitate physical coupling of the male and female connector components 20, 40 when an electrical connection is to be made. Complimentary keying structures or mechanisms 25, **25*a*** are preferably formed on or as part of the female and male couplings to limit the male and female connector components to being coupled only in a predetermined orientation. The keying mechanisms can be provided in a variety of complimentary geometric shapes and arrangements, as described in further detail below.

Similarly, the male and female coupling housings 24, 44 are formed in complimentary shapes to facilitate receiving and retaining the respective male and female couplings and to facilitate coupling the male and female connector components. Preferably the exterior surfaces of the male and female coupling housings 24, 44 are ergonomically shaped to facilitate grasping and manipulating the male and female connector components for ease of coupling and decoupling.

C. Male Connector Components

1. Male Coupling.

Referring to FIGS. 3-6, the male connector component 20 includes a male coupling 22. The male coupling 22 is formed in a substantially cylindrical shape having a longitudinal axis 23. The male coupling has a front end 26 and a back end 28 connected by a central section 30.

The front end 26 has an annular cylindrical housing 32 that extends outwardly and forwardly from the central section 30 substantially coaxially with the longitudinal axis 23. One side of the cylindrical housing 32 has a thicker cross section comprising a trapezoidal extension **25*a* that functions as a keying structure. A substantially cylindrical central space 34 is enclosed by the cylindrical housing 32 and by the central section 30, but is open at its forward end. Within the central space 34 is a retaining structure 36. The retaining structure 36 is substantially cylindrical in shape and extends outwardly and forwardly from the central section 30 into the central space 34 substantially coaxially with the longitudinal axis 23. The retaining structure is recessed within the central space 34 and does not extend beyond the distal end of the annular cylindrical housing 32**.

The retaining structure 36 includes an annular shoulder 50. The shoulder 50 extends annularly around the periphery of the retaining structure 36 at a location recessed rearward from the forward facing end thereof. The shoulder 50 includes a forward face 51 with a plurality of openings 55 formed therein and spaced radially around the periphery of the retaining structure. A plurality of channels 52 extend from the openings 55 through the shoulder 50 and the central section 30 to the back end 28 of the male coupling. The channels and openings are adapted to receive and retain a plurality of outwardly extending electrically conductive pins 54 as described in further detail below.

The retaining structure also includes a substantially cylindrical cavity 38. The cavity 38 is substantially coaxial with the longitudinal axis 23 and extends rearward within the body of the retaining structure from the forward facing end thereof. The cavity 38 is adapted to receive and retain a magnetic latching element 56 as described in further detail below.

The back end 28 has an annular cylindrical housing 58 that extends outwardly and rearward from the central section 30 substantially coaxially with the longitudinal axis 23. A substantially cylindrical central space 60 is enclosed by the cylindrical housing 58 and by the central section 30, but is open at its rearward end. The channels 52 that extend from the front end 26 through the central section 30 terminate in the central space 60. The outer periphery of the housing 58 is provided with an annular ramp-shaped locking structure 62 that extends intermittently around the periphery of the outer periphery. The ramp of the locking structure 62 preferably is forward facing with a substantially vertical forward surface 62*a* to permit the back end 28 of the male coupling 22 to be slid into the male coupling housing 24 and to engage a corresponding annular ramp-shaped locking depression 64 on the male coupling housing 24 to lock the male coupling into the male coupling housing, as described in greater detail below.

2. Male Coupling Housing.

The male coupling housing 24 is adapted to receive, retain, and enclose the back end 24 of male coupling 22 and the electrical wire connections between the cable 26 and the male coupling 22. In the example embodiment, the male coupling housing 24 is a substantially cylindrical body having a front end 66, a back end 68, and a longitudinal axis 23*a* which is co-linear with the longitudinal axis 23 of the male coupling 22 when the male coupling housing 24 and male coupling 22 are aligned to be assembled. The diameter of the front end 66 is greater than the diameter of the back end 68 and the cylindrical body tapers from the front end to the back end.

The front end 66 has a substantially cylindrical opening 70 that exposes a substantially cylindrical cavity 72 within the cylindrical body. The opening 70 and cavity 72 are substantially centered on the longitudinal axis 23*a*. The inner diameters of the opening 70 and cavity 72 are dimensioned to receive the back end 28 of the male coupling 22. The cavity 72 preferably extends rearward in the male coupling housing 24 a sufficient distance for the back end 28 of the male coupling to be completely enclosed within the male coupling housing 24.

An annular ramp-shaped locking depression 64 is formed on the inner surface of the cavity 72 and extends intermittently around the inner periphery of the cavity at intervals corresponding to the intervals at which the ramp-shaped locking structure 62 extends around the periphery of the back end 28 of the male coupling 22. Preferably the ramp shape of the locking depression is forward facing with a substantially vertical forward surface 64*a* to permit the forward facing ramp of the locking structure 62 to slide into the ramp-shaped depression of the locking depression 64 and the vertical faces 62*a*, 64*a* of the locking structure 62 and locking depression 64 to engage to lock the back end 28 of the male coupling 22 within the male coupling housing 24 and to prevent it from sliding forward out of the male coupling housing. The locking depression 64 is positioned relative to the forward end 66 of the male coupling housing 24 and the locking structure 62 is positioned relative to the back end 28 of the male coupling 22 a sufficient distance so that they engage to lock the back end 28 of the male coupling 22 into the male coupling housing 24 when the back end 28 of the male coupling 22 is completely enclosed within the cavity 72 of the male coupling housing 24.

Also, to ensure that the back end 28 of the male coupling 22 cannot be over inserted into the male coupling housing 24, the central section 30 of the male coupling 22 has a flange 74 that extends annularly around the periphery of the central section 30 just forwardly of the back end 28. When the back end 28 of the male coupling 22 is fully enclosed within the cavity 72 the front end 66 of the male coupling housing abuts the flange 74 to prevent further insertion.

The back end 68 has a substantially cylindrical opening 78 into a substantially cylindrical passageway 80 that extends from the opening 78 through the body of the male coupling housing 24 to the cavity 72 in the front end 66. The opening 78 and passageway 80 are substantially centered on the longitudinal axis 23*a*. The opening 78 and passageway 80 are dimensioned to receive and retain an electrical cable 26. Preferably the opening 78 and passageway 80 are dimensioned to permit the male coupling housing 24 to be rotated at least slightly about the cable to allow the locking depressions 64 of the male coupling housing 24 to be aligned with the locking structures 62 of the male coupling 22 during assembly while still retaining the cable relatively securely and effectively sealing the interior of the male coupling from the outside environment. The electrical cable 26 typically carries a plurality of electrically conductive wires 26*a*, such as braided or solid core copper wires, with each wire being encased in an insulating sheath. Preferably, the insulation is stripped from the ends of the wires 26*a*.

A plurality of electrically conductive pins 54 are adapted to be connected to the stripped ends of the wires 26*a*. Those skilled in the art will appreciate that the pins 54 may be constructed of commonly known electrically conductive materials including various copper alloys such as brass, phosphor-bronze, or other alloys, and may be plated with various well-known plating materials such as gold, nickel, palladium, tin, or others, depending on application requirements. The pins 54 may be formed by suitable molding, stamping, machining or metal forming processes, or a combination thereof. Many such processes are known to persons skilled in the art and need not be reiterated herein. The pins 54 may embody solder cups, solder tails, crimp structures, or a combination of elements to facilitate soldered and/or mechanical electrical connection with the stripped ends of the wires 26*a*. Once the male coupling 22 and male coupling housing 24 assembled as described below, the pins 54 extend outwardly through the openings 55 in the retaining structure 36 of the male coupling 22 spaced radially around the magnetic latching element 56.

Figure 5:
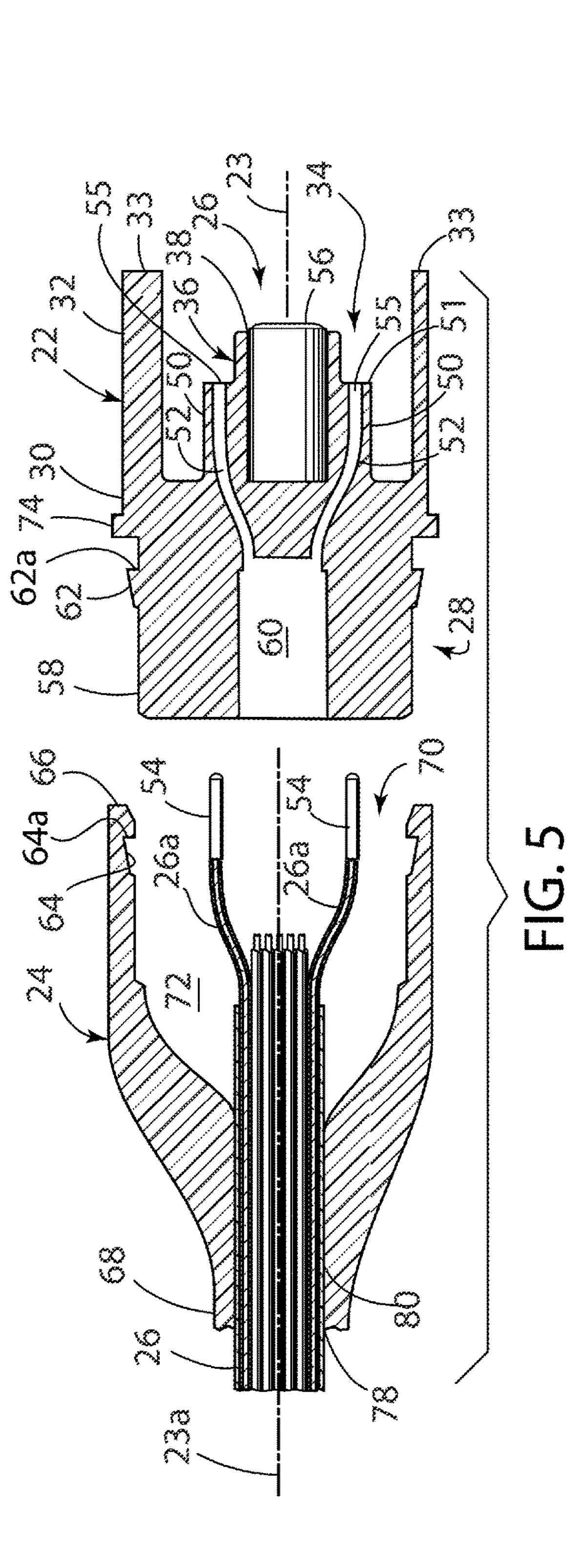
FIG. 5 is an exploded cross-sectional side view of a male component of a magnetic latching connector in accordance with an example embodiment.

The male coupling 22 and male coupling housing 24 are assembled to form the male connector component 20. Assembly is accomplished by inserting the end of cable 26 into the opening 78 of the male coupling housing 24 and advancing the cable through the passageway 80 until the end is exposed in the cavity 72. The exposed stripped ends of a plurality of electrically conductive wires 26*a* are electrically connected to the rearward ends of a corresponding plurality of electrically conductive pins 54 as described above. Although FIG. 5 illustrates the pins 54 as being directly attached to the ends of the wires 26*a* within the cavity 72, it is contemplated that the pins 54 may be press fit in the channels 52 of the male coupling 22 extending outwardly from the openings 55 at the forward ends of the channels prior to being connected to the ends of the wires 26*a*. Those skilled in the art will appreciate that retaining structures (not shown), such as forward sloping ramps or collars may be incorporated in the periphery of the bodies of the pins 54 to facilitate press fitting the pins into the channels 52 and openings 55, while preventing the pins 54 from moving rearward in the channels 52 once fully inserted and seated. The retaining structures may be similar to or the same as elements 184, 186 described below with respect to sockets 112 of the female coupling 42.

It is further contemplated that the pins need not be directly connected to the ends of the wires 26*a*. Rather, it is contemplated that a printed circuit board, flex circuit, or similar structure (not shown) may be mounted and retained within the central space 60 of the back end 28 of the male coupling 22. The ends of the wires 26*a* could be connected to wire connectors or bonds on the rearward facing side or face of the structure, and the forward facing side or face of the structure could contain lead lines and/or pins that pass through the channels 52 and extend outwardly from the openings 55.

Regardless of whether the pins 54 are attached to the wires 26*a* before or after being press fit in the channels 52 and openings 55 of the male coupling 22, the pins preferably are positioned so that they remain recessed in the cavity 26 of the male coupling 22 and extend outwardly and forwardly from the openings 55 into the cavity 26 no farther forward than, and preferably slightly less far forward than, the magnetic latching element 56. This configuration allows the magnetic latching element 56 to engage a corresponding magnetic latching element 116 in the female coupling 42 while the pins 54 fully engage with corresponding sockets 112 of the female coupling 42 as described in further detail below.

After the wires 26*a* are connected to the pins 54 and the pins are press fit in the openings 55 as described above, the front end 66 of the male coupling housing 24 is aligned with the back end 28 of the male coupling 22 so that the locking depression 64 of the male coupling housing is aligned with the locking structure 62 of the male coupling 22. The back end 28 of the male coupling 22 is then inserted into the male coupling housing 24 until the back end 28 is fully enclosed within the cavity 72 with the front edge 66 of the male coupling housing 24 abutting the flange 74 on the central section 30 of the male coupling 22 and the ramp-shaped locking structure 62 of the male coupling 22 is seated in the ramp-shaped locking depression 64 of the male coupling housing 24 with the vertical faces 62*a*, 64*a* engaged. At this point, the male coupling 22 is locked in place in the male coupling housing 24. It is noted that care should be taken during the assembly process not to over-rotate the cable 26, which could stress and possibly damage the electrical connections between the wires 26*a* and pins 54.

Those skilled in the art will realize that there are various alternatives to using locking structures and depressions to assemble the male coupling 22 and male coupling housing 24 into male connector component 20. For example, corresponding threaded structures could be provided on the back end 28 of the male coupling 22 and the interior surface of the cavity 72 of the male coupling housing 24. Other types of mechanical fastening structures also could be used. Those skilled in the art will also appreciate that a conventional over-molding technique may be used wherein the male coupling housing 24 is over-molded on portions of the male coupling 22 and cable 26 after the cable 26 and wires 26*a* have been inserted in the male coupling 22, the wires have been electrically connected to pins 54, and the pins 54 have been set in place, as described above. In this alternative, the back end 28 of the male coupling 22 and a portion of the connected cable 26 extending rearward from backend 28 may be enclosed in a mold and the material comprising the male coupling housing 24 may be thermally or injection molded over them, permanently sealing the connection between the cable and the male coupling and creating a unitary male connector component 20.

D. Female Connector Components

1. Female Coupling.

Referring again to FIGS. 3-6, the female connector component 40 includes a female coupling 42. The structure and dimensions of the female coupling 42 are similar and complementary to the corresponding structure and dimensions of the male coupling 22 to facilitate coupling the male 20 and female 40 components. The female coupling 42 is formed in a substantially cylindrical shape having a longitudinal axis 90. The female coupling has a front end 92 and a back end 94 connected by a central section 96.

The front end 92 has an annular cylindrical housing 98 that extends outwardly and forwardly from the central section 96 substantially coaxially with the longitudinal axis 90. A substantially cylindrical central space 100 is enclosed by the cylindrical housing 98 and by the central section 96, but is open at its forward end. One side of the opening and central space 100 is preferably extended to form a trapezoidal space 25 that functions as a keying mechanism. Together, the trapezoidal extension 25*a* of the male coupling and trapezoidal space 25 of the female coupling ensure that the male and female couplings 20, 40 can be coupled in only a predetermined orientation. The central space 100 terminates in a recessed rear vertical wall 99 adjacent to the central section 96.

Within the central space 100 is a retaining structure 102. The retaining structure 102 is substantially cylindrical in shape and extends outwardly and forwardly from the central section 96 into the central space 100 substantially coaxially with the longitudinal axis 90. The retaining structure is recessed within the central space 100 and does not extend beyond the distal end of the annular cylindrical housing 98. The retaining structure 102 includes an annular projection 104 that extends annularly around the periphery of the retaining structure and constitutes the forward most portion of the retaining structure 102 within the central space 100. The annular projection 104 includes a forward face 106 with a plurality of openings 108 formed therein and spaced radially around the periphery of the retaining structure 102. A plurality of channels 110 extend from the openings 108 through the annular projection 104 and the central section 96 to the back end 94 of the female coupling. The channels and openings are adapted to receive and retain a plurality of electrically conductive sockets 112 as described in further detail below.

The retaining structure 102 also includes a substantially cylindrical cavity 114. The cavity 114 is recessed rearward of the annular projection 104 and extends rearward into the body of the retaining structure 102 from the forward facing end thereof. The cavity 114 is substantially coaxial with the longitudinal axis 90. The cavity 114 is adapted to receive and retain a magnetic latching element 116 as described in further detail below.

The back end 94 of the female coupling 42 has an annular cylindrical housing 118 that extends outwardly and rearward from the central section 96 substantially coaxially with the longitudinal axis 90. A substantially cylindrical central space 120 is enclosed by the cylindrical housing 118 and by the central section 90, but is open at its rearward end. The central space 120 is substantially centered on the longitudinal axis 90. The channels 110 that extend from the front end 98 through the central section 90 terminate in the central space 120. The outer periphery of the housing 118 is provided with an annular ramp-shaped locking structure 122 that extends intermittently around the outer periphery. The ramp of the locking structure 122 preferably is forward facing with a substantially vertical forward surface **122*a* to permit the back end 94 of the female coupling 42 to be slid into the female coupling housing 44 and to engage a corresponding annular ramp-shaped locking depression 124 on the female coupling housing 44 to lock the female coupling 42 into the female coupling housing 44**, as described in greater detail below.

It should be noted that the annular cylindrical housing 98 of the front end 92 has an inner diameter dimensioned to permit the annular cylindrical housing 32 of the front end 26 of the male coupling 22 to be inserted into the annular cylindrical housing 98 of the front end 92 of the female coupling 42 with the inner surface of the annular cylindrical housing in sliding engagement with the outer peripheral surface of the cylindrical housing 32 when the male 20 and female 40 connector components are coupled. It should be further noted that the central space 100 of the front end 98 of the female coupling 42 has a depth dimension that allows the front end 32 of the male coupling 22 to be inserted into and substantially enclosed within the central space 100 of the female coupling 42 with the front face 33 of the front end 32 of the male coupling 22 engaged with the recessed vertical wall 99 of the front end 98 of the female coupling 22 when the male 20 and female 40 connector components are coupled.

2. Female Coupling Housing.

The female coupling housing 44 is adapted to receive, retain and enclose the back end 94 of female coupling 42 and the electrical wire connections between the cable 46 and the female coupling 42. In the example embodiment, the female coupling housing 44 is a substantially cylindrical body having a front end 126, a back end 128, and a longitudinal axis **90*a* which is co-linear with the longitudinal axis 90 of the female coupling 42 when the female coupling housing 44 and female coupling 42 are aligned to be assembled. The diameter of the front end 126 is greater than the diameter of the back end 128** and the cylindrical body tapers from the front end to the back end.

The front end 126 has a substantially cylindrical opening 130 that exposes a substantially cylindrical cavity 132 within the cylindrical body. The opening 130 and cavity 132 are substantially centered on the longitudinal axis **90*a*. The inner diameters of the opening 130 and cavity 132 are dimensioned to receive the back end 94 of the female coupling 42. The cavity 132 preferably extends rearward in the female coupling housing 44 a sufficient distance for the back end 94 of the female coupling 42 to be completely enclosed and engaged within the female coupling housing 44**.

An annular ramp-shaped locking depression 124 is formed on the inner surface of the cavity 132 and extends intermittently around the inner periphery of the cavity at intervals corresponding to the intervals at which the ramp-shaped locking structure 122 extends around the periphery of the back end 94 of the female coupling 42. Preferably the ramp shape of the locking depression is forward facing with a substantially vertical forward surface **124*a* to permit the forward facing ramp of the locking structure 122 to slide into the ramp-shaped depression of the locking depression 124 and the vertical faces 122*a*, 124*a* of the locking structure 122 and locking depression 124 to engage to lock the back end 94 of the female coupling 42 within the female coupling housing 44 and to prevent it from sliding forward out of the female coupling housing. The locking depression 124 is positioned relative to the front end 126 of the female coupling housing 44 and the locking structure 1222 is positioned relative to the back end 94 of the female coupling 42 a sufficient distance so that they engage to lock the back end 94 of the female coupling 42 into the female coupling housing 44 when the back end 94 of the female coupling 42 is completely enclosed within the cavity 132 of the female coupling housing 44**.

Also to ensure that the back end 94 of the female coupling 42 cannot be over inserted into the female coupling housing 44, the central section 96 of the female coupling 42 has a shoulder 97 that extends annularly around the periphery of the central section 96 at the location where the central section transitions into the back end 94 and just forward of the locking structure 122. When the back end 94 of the female coupling 42 is fully enclosed within the cavity 132, the front end 126 of the female coupling housing 44 abuts the shoulder 97 to prevent further insertion.

The back end 128 has a substantially cylindrical opening 138 into a substantially cylindrical passageway 140 that extends from the opening 138 through the body of the female coupling housing 44 to the cavity 132 in the front end 126. The opening 138 and passageway 140 are substantially centered on the longitudinal axis **90*a*. The opening 138 and passageway 140 are dimensioned to receive and retain an electrical cable 46. Preferably the opening 138 and passageway 140 are dimensioned to permit the female coupling housing 144 to be rotated at least slightly about the cable to allow the locking depressions 124 of the female coupling housing 44 to be aligned with the locking structures 122 of the female coupling 42 during assembly while still retaining the cable relatively securely and effectively sealing the interior of the female coupling from the outside environment. The electrical cable 46 typically carries a plurality of electrically conductive wires 46*a*, such as braided or solid core copper wires, with each wire being encased in an insulating sheath. Preferably, the insulation is stripped from the ends of the wires 46*a***.

A plurality of electrically conductive sockets 112 are adapted to be electrically connected to the stripped ends of the wires **46*a*. Those skilled in the art will appreciate that the sockets 112 may be constructed of commonly known electrically conductive materials including various copper alloys such as brass, phosphor-bronze, or other alloys, and may be plated with various well-known plating materials such as gold, nickel, palladium, tin, or others, depending on application requirements. The sockets 112 may be formed by suitable molding, stamping, machining or metal forming processes, or a combination thereof. Many such processes are known to persons skilled in the art and need not be reiterated herein. Those skilled in the art also will appreciate that the sockets 112 may embody solder cups, solder tails, crimp structures, or a combination of elements to facilitate soldered and/or mechanical electrical connection with the stripped ends of the wires 46***a*. With the female coupling 42 and female coupling housing 44 assembled as described below, the sockets 112 are recessed within annular projection 104 of the female coupling 42 axially aligned with the openings 108 in the annular projection around the magnetic latching element 116.

Figure 6:
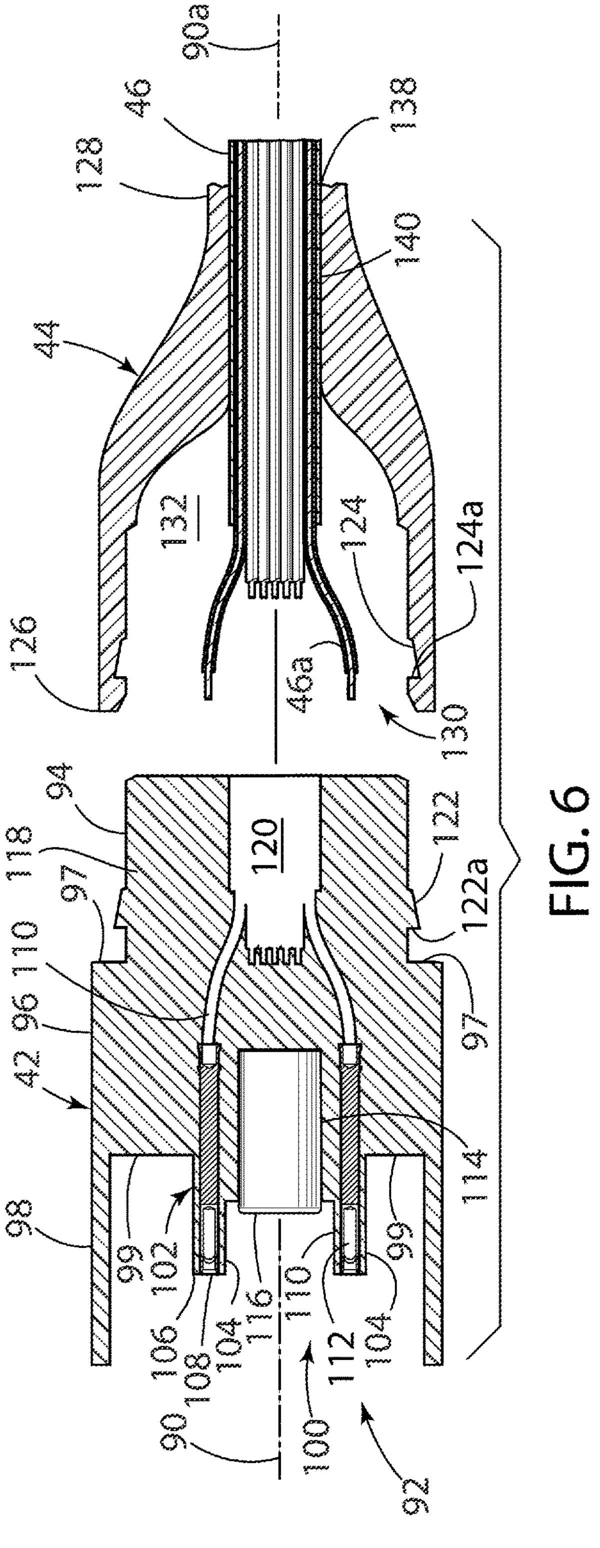
FIG. 6 is an exploded cross-sectional side view of a female component of a magnetic latching connector in accordance with an example embodiment.

The female coupling 42 and female coupling housing 44 are assembled to form the female connector component 40. Assembly is accomplished by inserting the end of cable 46 into the opening 138 of the female coupling housing 44 and advancing the cable through the passageway 140 until the end is exposed in the cavity 132. The exposed stripped ends of a plurality of electrically conductive wires 46*a* are conductively connected to a corresponding plurality of electrically conductive sockets 112 as described above. Although FIG. 6 illustrates the sockets 112 as being attached to the ends of the wires 46*a* directly, it is contemplated that the sockets 112 may be directly or indirectly connected to the wires 46*a*, and may be press fit in the channels 97 and openings 108 either before or after being connected to the ends of the wires 26*a*, similarly to the pins 54 of the male coupling 22.

Regardless of whether the sockets 112 are attached to the wires 46*a* before or after being press fit in the channels 97 and openings 108 of the female coupling 42, the sockets preferably are positioned so that they remain recessed in the annular extension 104 of the female coupling 42 within the cavity 100 sufficiently forward of the magnetic latching element 116 so that when the male and female components 20, 40 are coupled, the forward extending retaining structure 36 of the male coupling 22 is substantially fully enclosed within the annular projection 104 of the female coupling 42 with the magnetic latching element 56 of the male coupling 22 securely engaged with the corresponding magnetic latching element 116 of the female coupling 42 and the pins 54 of the male coupling 22 fully and securely engaged with the corresponding sockets 112 of the female coupling 42 as described in further detail below.

With the wires 46*a* connected to the sockets 112 and the sockets securely press fit in the openings 108 as described above, the front end 126 of the female coupling housing 44 is aligned with the back end 94 of the female coupling 42 so that the locking depressions 124 of the female coupling housing are aligned with the locking structures 122 of the female coupling 42. The back end 94 of the female coupling 42 is then inserted into the female coupling housing 44 until the back end 94 is fully enclosed within the cavity 130 with the forward face of the front end 126 of the female coupling housing 44 abutting the annular shoulder 110 at the rearward end of the central section 96 of the female coupling 42, and the locking structure 122 of the female coupling 42 is seated in the locking depression 124 of the female coupling housing 44 with the vertical faces 122*a*, 124*a* engaged. At this point, the female coupling 42 is locked in place in the female coupling housing 44. It is noted that care should be taken during the assembly process not to over-rotate the cable 46, which could stress and possibly damage the electrical connections between the wires 46*a* and sockets 112.

Those skilled in the art will realize there are various alternatives to using locking structures and depressions to assemble the female coupling 42 and female coupling housing 44 into female connector components 40. For example, corresponding threaded structures could be provided on the periphery of the back end 94 of the female coupling 42 and on the interior surface of the cavity 132 of the female coupling housing 44. Other types of mechanical fastening structures also could be used. Those skilled in the art also will appreciate that a conventional over-molding technique may be used wherein the female coupling housing 44 is over-molded on portions of the female coupling 42 and cable 46 after the cable 46 and wires 46*a* have been inserted in the female coupling 42, the wires have been electrically connected to sockets 112, and the sockets have been set in place, as described above. In this alternative, the back end 94 of the female coupling 42 and a portion of the connected cable 46 extending rearward from back end 94 may be enclosed in a mold and the material comprising the female coupling housing 44 may be thermally or injection molded over them, permanently sealing the connection between the cable and the female coupling and creating a unitary female connector component 40.

E. Female Socket

Figures 7, 8, 9:
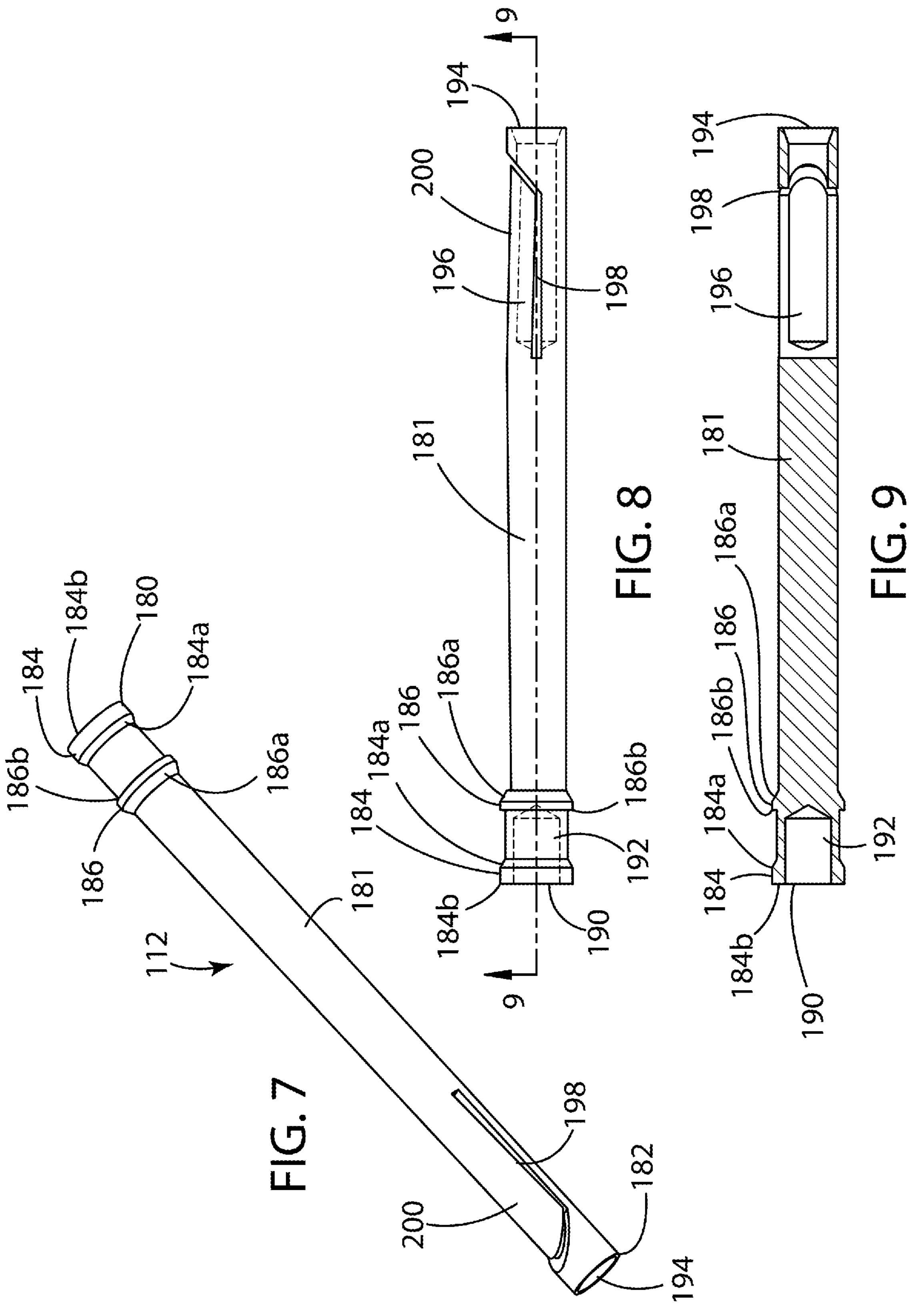
FIG. 7 is a perspective view of a female socket of a magnetic latching connector in accordance with an example embodiment.
FIG. 8 is a side view of a female socket of a magnetic latching connector in accordance with an example embodiment.
FIG. 9 is a cross-sectional side view of a female socket of a magnetic latching connector in accordance with an example embodiment.

Referring to FIGS. 7-9, a preferred form of electrically conductive female socket 112 for use in the example embodiment is illustrated.

The socket 112 is constructed as an elongated cylinder having a longitudinal axis, a rear end 180 and a front end 182. The intermediate portion 181 of the cylinder between the rear and front ends is preferably solid to increase stiffness of the socket and to reduce its electrical resistance. Immediately adjacent to the rear end 180 are one or more annular projections 184, 186 extending outwardly from the periphery of the cylinder and spaced apart along the longitudinal axis of the cylinder. The annular projections 184, 186 have forward surfaces 184*a*, 186*a* that slope downwardly until they merge into the periphery of the socket 112 and rearward surfaces 184*b*, 186*b* that are substantially vertical and transverse to the longitudinal axis of the socket 112. The sloped forward surfaces 184*a*, 186*a* facilitate press fitting the socket 112 in the channel 110 of the female coupling 42 and advancement therein until the front end 182 is exposed in the opening 108 of the annular projection 104 of the female coupling 42. The substantially vertical rearward surfaces 184*b*, 186*b* assist in retaining the socket 112 in the channel 110 and prevent the socket 112 from moving rearward in the channel 110 once seated.

The rear end 180 of the socket 112 comprises a solder cup with a cylindrical opening 190 into a cylindrical space 192. The opening 190 and space 192 are preferably coaxial with the longitudinal axis of the cylinder. The solder cup is adapted to receive the exposed stripped end of a wire 46*a* inserted into the back end 94 of the female coupling 42. The cylindrical opening 190 and space 192 are preferably dimensioned to receive and enclose the exposed end of the wire as well as an amount of liquid solder sufficient to fill the space 192. Preferably, upon solidification, the solder will securely retain the end of the wire in the solder cup and form an electrically conductive connection between the wire 46*a* and the socket 112. Suitable dimensions for the opening 190 and 192 will depend on the gauge of the wire 46*a*, which will in turn depend on the application for which the connector is intended. For example, 30 gauge wire has an outer diameter of 0.01 inches and is suitable for applications involving relatively low level electrical signals under one ampere. The relationship between wire size and electrical current carrying capacity is well known to those skilled in the art.

The front end 182 of the socket 112 also has a cylindrical opening 194 and cylindrical space 196. The opening 194 and space 196 are preferably coaxial with the longitudinal axis of the cylinder. The cylindrical opening 194 and space 196 function to receive and releasably retain an outwardly extending pin 54 of the male coupling 22 when the male and female connector components 20, 40 are coupled. Preferably the cylindrical opening 194 and space 196 are dimensioned to securely receive and releasably retain the pin 154 so that substantially the entire length of the pin that is exposed in the male coupling is enclosed within the space 196 when the male and female connector components are coupled. Additionally, the opening 194 and space 196 are preferably dimensioned so that the pin 154 is in secure physical contact with the socket 112 around substantially its entire circumference when the male and female connector components are coupled.

A narrow elongated slot 198 preferably extends longitudinally along opposite sides of the socket 112 coplanar with the longitudinal axis of the socket 112 from a point near the opening 194 to a point approximately where the cylindrical space 196 terminates within the socket 112. The slot extends through the cylindrical space 196 from both opposite sides of the socket 112. At a point near but inwardly spaced from the opening 194 the slot angles upwardly and through the surface of the socket approximately 90 degrees from the opposite sides. The slot 198 thus forms an elongated linear spring 200 with an inclined forward edge in the socket 112. The spring 200 functions to help retain a pin 154 of the male coupling 22 in secure contact with the socket 112 within the cylindrical space 196 when the male and female components 20, 40 are coupled. Preferably the forward end of the spring 200 is biased slightly inwardly toward the longitudinal axis of the socket 112 to provide a biasing force urging the pin 54 into secure contact with the socket 112.

As the pin 54 is inserted into the space 196, its periphery engages the inclined forward edge of the spring 200 causing the spring to rotate slightly outwardly from the longitudinal axis of the socket from the end point of the slot 198 near the termination of the space 196. In response, the spring 200 exerts an inward force on the pin 154 that urges the periphery of the pin 154 into secure contact with the inner surface of the socket 112 within the cylindrical space 196. Once the biasing force of the spring 200 is overcome upon insertion of the pin 154, the magnetic attraction force of the magnetic latching elements 56, 116 effectively causes the male and female connector components 20, 40 to snap together. When the pin 154 is removed from the socket 112 the spring 200 returns to its initial position. The biasing force of the spring 200 combined with the magnetic attraction force of the magnetic latching elements 56, 116 establishes the amount of force required to decouple the male and female connector components 20, 40.

F. Male and Female Magnetic Latching Elements

The male and female magnetic latching elements 56, 116 may both be constructed of a magnetic material, or one may be constructed of a magnetic material and the other of a magnetic attractive material such as a ferrous or ferromagnetic metal material. It will of course be readily apparent to persons skilled in the art that the magnetic polarities of the male and female magnetic latching elements must be oriented so that the magnetic force between the male and female magnetic latching elements is attractive. Either or both of the male and female magnetic latching elements may constitute or include a permanent magnet, an electromagnet, a rare earth magnet or a similar type of magnet, many types and variations of which are known to persons skilled in the art.

The male and female magnetic latching elements 56, 116 of the example embodiment illustrated in FIGS. 1-6 are preferably cylindrical in shape with substantially flat end faces. The latching elements are preferably disposed and oriented within the respective male and female couplings 22, 42 so that when the couplings are coaxially aligned for coupling the flat end faces are oppositely facing. The preferred shape and disposition of the magnetic latching elements thus enable the faces of the magnetic latching elements to make good contact with each other when the male and female connector components 20, 40 are coupled. They also provide a suitable amount of contact area so that a desired amount of magnetic force is present between the male and female connector components when coupled. Still further, the preferred cylindrical shapes provide a suitable amount of area for the male and female magnetic latching elements 56, 116 to be securely affixed in the cavities 38 and 114 of the male and female couplings 22, 42. The latching elements may be securely affixed using a suitable adhesive or by other methods known to those skilled in the art.

The male and female magnetic latching elements are constructed of a material, and in a shape, and size selected to provide a predefined attractive magnetic force suitable for the intended application of the magnetic latching connector. For most medical applications, a magnetic force of approximately two pounds is preferred to provide secure physical and electrical coupling between the male and female connector components, while still permitting the male and female connector components to decouple in response to a decoupling force with minimal risk of damage to equipment or injury to persons. Generally, it is preferred to select the magnetic latching elements to provide the minimum magnetic force suitable for the particular intended application of the magnetic latching connector since strong magnetic fields in proximity to electrical conductors can result in interference with the electrical signals in the conductors in some situations, as persons skilled in the art are aware.

While the male and female magnetic latching elements 56, 116 are preferably constructed in cylindrical form for a number of reasons, some set forth above, they are not necessarily formed in that shape or in any particular shape or size. Rather, persons skilled in the art will readily appreciate that the male and female magnetic latching elements may be formed in any number of other shapes and sizes consistent with the purposes and functionalities described herein.

Another consideration in selecting a suitable size and shape for the male and female magnetic latching elements 56, 116 is that it is preferred for the male and female magnetic latching elements to remain recessed within the outer housings 32, 98 of the male and female couplings 22, 42 even when the male and female connector components 20, 40 are not coupled. The male and female magnetic latching elements 56, 116 are thus protected from the environment and from being damaged or compromised by inadvertent physical contact with objects, chemicals, or other elements in the environment.

G. Additional Male and Female Connector Component Embodiments

While an example embodiment has been shown and described in which the male and female connector components 20, 40 are substantially cylindrical in shape and are connected to the ends of electrical cables, other example embodiments incorporating the principles and benefits of the invention are also possible and will be apparent to persons skilled in the art from the descriptions herein.

Figure 10:
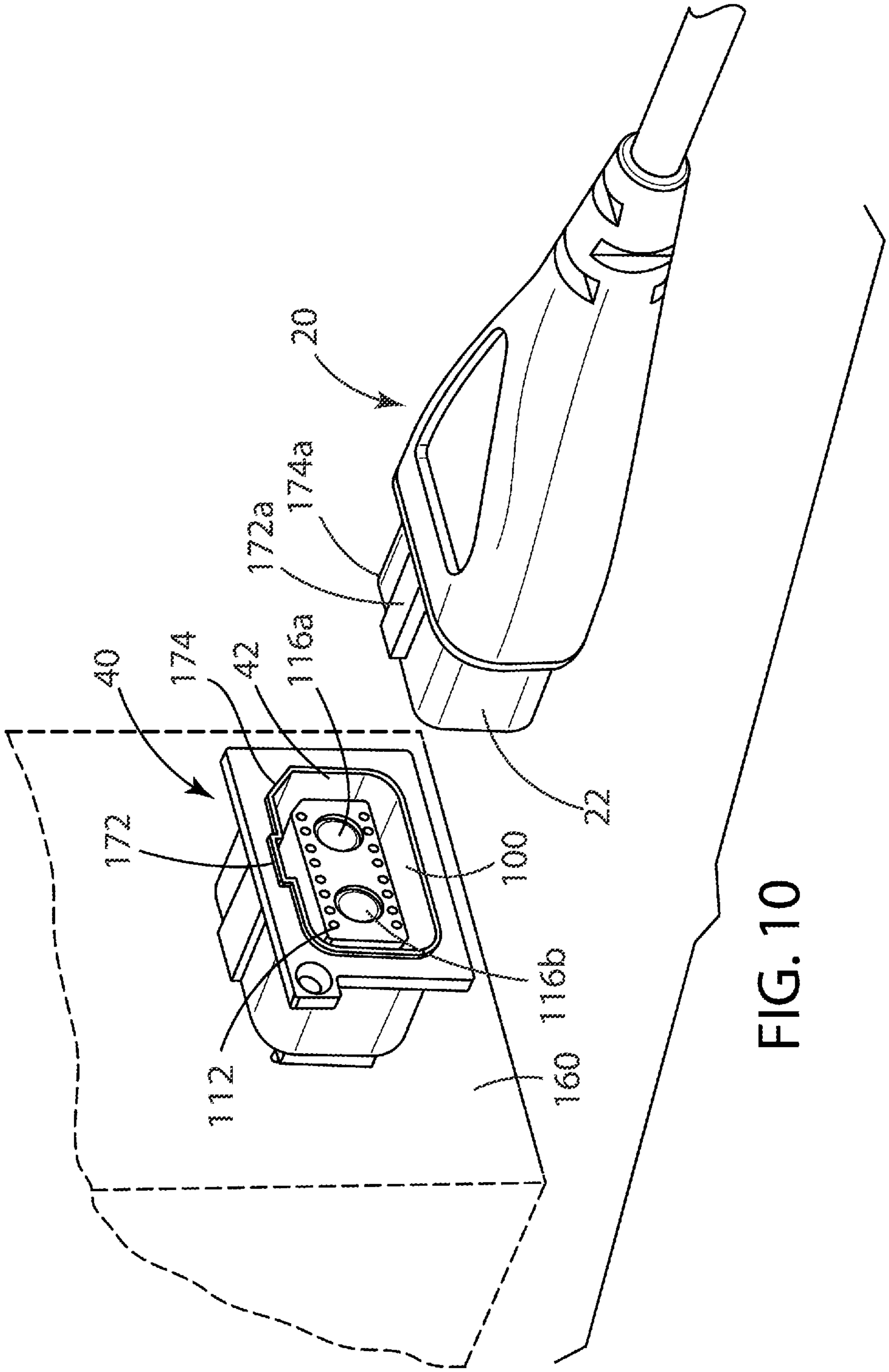
FIG. 10 is a perspective view of a magnetic latching connector in accordance with another example embodiment.
Figure 11:
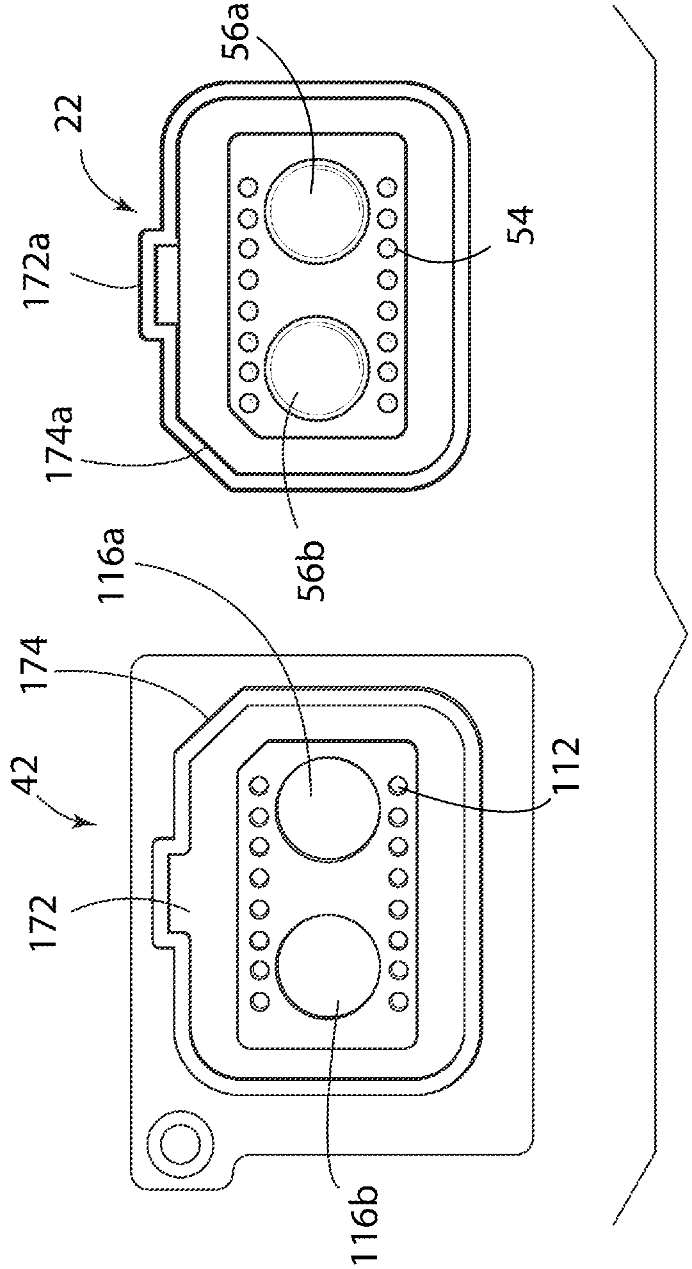
FIG. 11 is a front end view of a magnetic latching connector in accordance with the example embodiment of FIG. 10.

FIGS. 10-11 illustrate an example embodiment in which the male 20 and female 40 connector components are substantially rectangular in shape. Additionally, the female connector component 40 is adapted to be permanently mounted in a cabinet 160 of a device or piece of equipment via screws or other fasteners (not shown) or in any other suitable manner, and is electrically connected with wires (not shown) of the device or equipment inside the cabinet. Persons skilled in the art will appreciate that while the female connector component is mounted in the cabinet, the male connector component could instead be mounted in the cabinet. Those skilled in the art also will appreciate that either of the male and female connector components could be formed in other cross-sectional shapes, such as substantially cylindrical shapes, and could be provided with threaded structures to facilitate mounting to the cabinetry via a corresponding threaded fastener, such as a nut.

Further, the male coupling 22 has two magnetic latching elements 56*a*, 56*b* spaced in the lengthwise direction of the rectangular-shaped male coupling and the female coupling 42 has two corresponding magnetic latching elements 116*a*, 116*b* spaced in the lengthwise direction of the rectangular-shaped female coupling. Still further, the electrically conductive pins 54 of the male coupling 22 and the corresponding electrically conductive sockets 112 of the female coupling 42 are arranged in two rows, one above and one below the corresponding magnetic latching elements 56*a*, 56*b* and 116*a*, 116*b* and extending in the lengthwise directions of the rectangular-shaped male and female couplings respectively.

Other construction details of this example embodiment are similar to those described above with respect to the example embodiment shown in FIGS. 1-6. For example, similar to the embodiment shown in FIGS. 1-6, the rectangular male coupling 22 may be assembled with the rectangular male coupling housing 24 via mechanical lock and receptor structures. One difference is that in this embodiment, the female connector component 40 is intended to be mounted with the back end of the female connector component enclosed inside a cabinet 160. Therefore, it is not necessary to provide a female coupling housing to protect the electrical connections between the wires of a cable and the female coupling as compared to embodiments in which the female coupling is adapted to be connected to the end of a cable exposed to the external environment. Another difference is that in this embodiment, the male coupling housing is over-molded on the male coupling 22 and cable to form a unitary male connector component 20.

Figure 12:
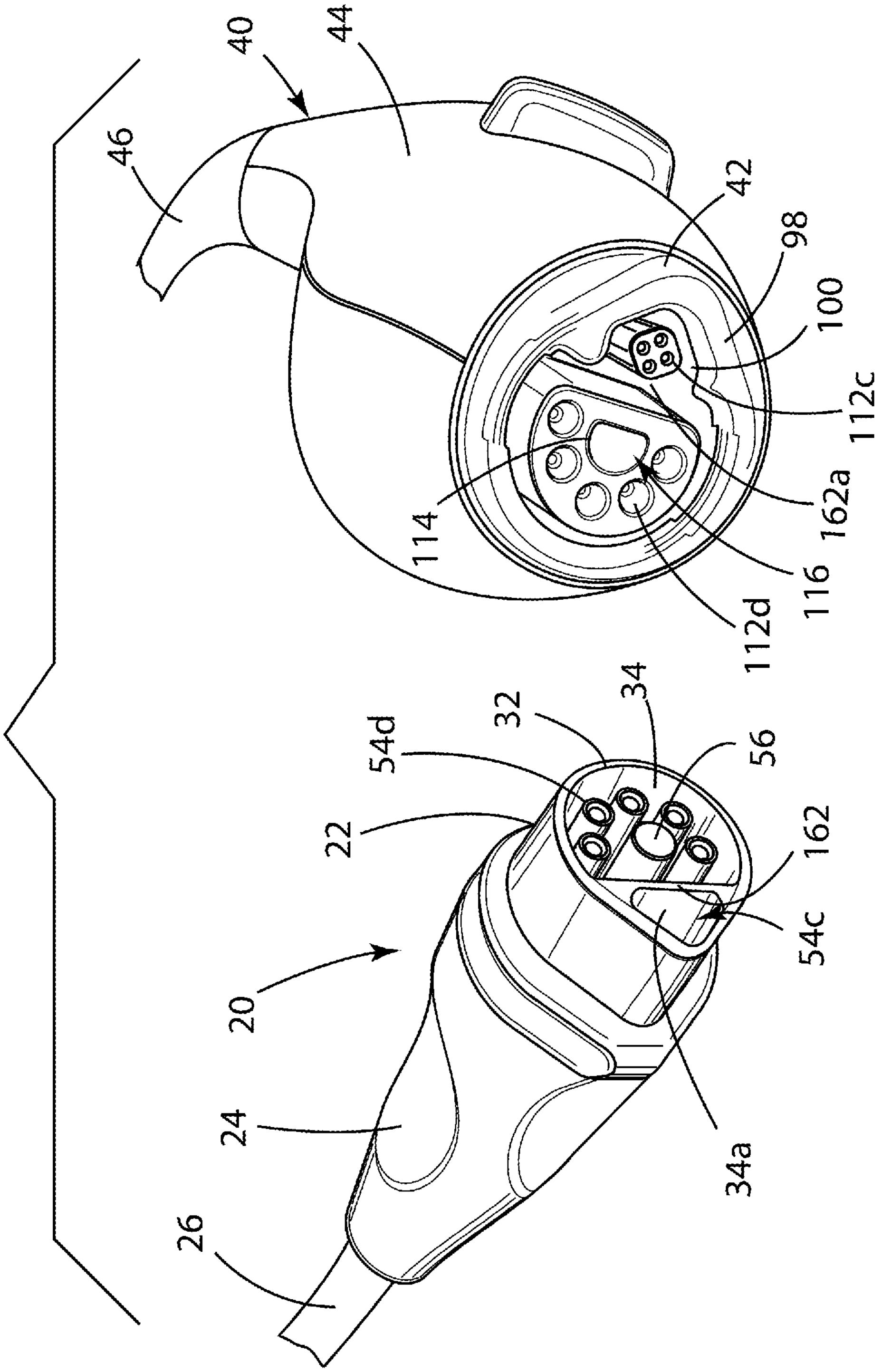
FIG. 12 is perspective view of a magnetic latching connector in accordance with still another example embodiment.

FIG. 12 illustrates another example embodiment in which the male and female connector components 20, 40 are shaped somewhat differently and include separate sets of conductive pins 54*c*, 54*d* and corresponding sets of conductive sockets 112*c*, 112*d*. In this embodiment, the male connector component 20 is substantially cylindrical in shape, and the female connector component 40 is formed in a somewhat bulbous shape. Of course persons of ordinary skill in the art will appreciate that regardless of the overall cross-sectional shapes of the male and female connector components 20, 40, the shapes, dimensions, and arrangements of the components making up the male and female couplings 22, 42 remain in correspondence to facilitate physical and electrical coupling of the male and female connector components 20, 40. Here, for example, the projecting outer housing 32 of the male coupling 22 defines not only a central space 34, but a second space 34*a* with the two spaces separated by a projecting wall 162.

A first set of electrically conductive pins 54*c* (not shown) are arranged recessed within the space 34*a* and a second set of electrically conductive pins 54*d* are arranged recessed within the space 34. Similarly, female coupling 42 has a first set of sockets 112*c* recessed in an arrangement corresponding to the arrangement of pins 54*c* and a second set of sockets 112*d* recessed in an arrangement corresponding to the arrangement of pins 54*d*. A gap 162*a* between the two sets of sockets 112*c*, 112*d* is positioned to receive the projecting dividing wall 162 when the male and female connector components 20, 40 are coupled together. Similarly to an earlier-described example embodiment, the male coupling 22 includes a magnetic latching element 56 extending outwardly but recessed within the space 34 enclosed by the outer housing 22. The female coupling 42 has a magnetic latching element 116 (not shown) within a recessed cavity 114 adjacent to the second set of sockets 112*d*. The recessed cavity is adapted to receive the forward extending magnetic element 56 when the male and female connector components 20, 40 are coupled together so that the magnetic latching elements 56, 116 are engaged to provide magnetic latching.

Other construction details of this example embodiment are similar to those described above with respect to the example embodiment shown in FIGS. 1-6. For example, the similar to the embodiment shown in FIGS. 1-6, the cylindrical male coupling 22 may be assembled with the male coupling housing 24 via mechanical locking and receptor structures. Similarly, the female coupling 42 may be assembled with the somewhat bulbous female coupling housing 44 via mechanical snap structures. One difference is that the female coupling housing 44 itself comprises a two piece structure with the two pieces assembled together via mechanical locking and receptor structures.

Figure 13:
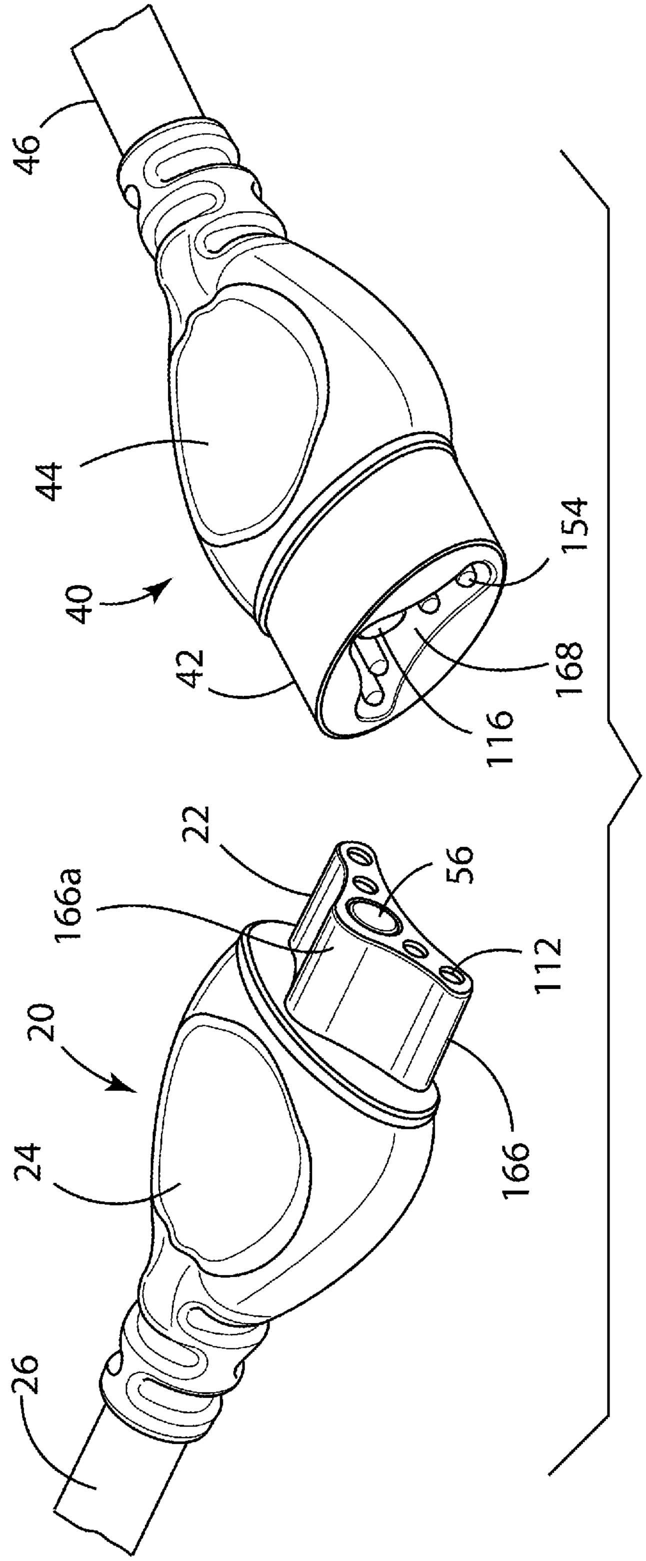
FIG. 13 is a perspective view of a magnetic latching connector in accordance with yet another example embodiment.
Figure 14:
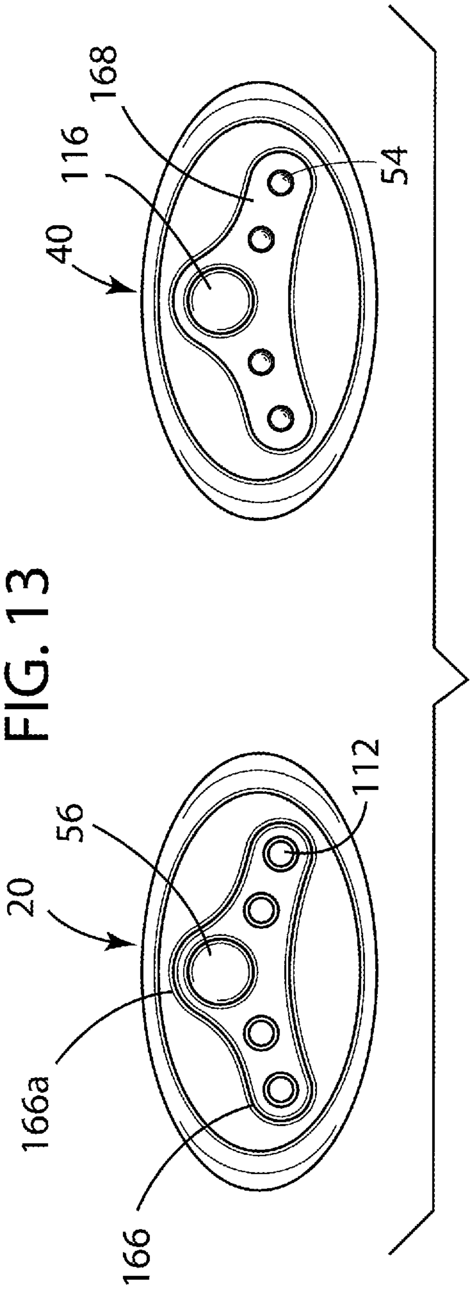
FIG. 14 is front end view of a magnetic latching connector in accordance with the example embodiment of FIG. 13.

FIGS. 13-14 illustrate yet another example embodiment in which the male and female connector components 20, 40 are substantially elliptical in shape. However, in this embodiment, the male coupling 22 comprises an outwardly extending projection 166 having an arcuate wing-like shape with a pronounced center section 166*a* and the female coupling forms a recessed space 168 in a corresponding shape and dimensioned to receive the projection 166 when the male and female connector components are coupled. In this embodiment, the corresponding shapes of the projection 166 of the male coupling 22 and the recessed space 168 of the female coupling 42 ensure that the male and female couplings 22, 42, and hence the male and female connector components 20, 40 can only be coupled in one predetermined orientation.

Another variation in this embodiment is that the female coupling 42 has a plurality of electrically conductive pins 54 recessed within the recessed space 168 rather than sockets, and the male coupling 22 has a corresponding plurality of electrically conductive sockets 112 recessed within the forward face of the outwardly extending projection 166 rather than pins. Thus, the sockets 112 in the male coupling are adapted to receive and engage the pins 54 of the female coupling when the male and female connector components are coupled. Also in this embodiment, the magnetic latching element 56 is mounted in a cavity in the outwardly extending projection 166 nearly flush with the forward face and is adapted to engage with a magnetic latching element 116 recessed within the recessed space 168 of the female coupling 42 when the male and female connector components are coupled. From this example embodiment, it will be apparent to persons skilled in the art that the corresponding male and female couplings 22, 42 each may contain a plurality of electrically conductive pins 54, sockets 112, or a combination of both.

Other construction details of this example embodiment are similar to those described above with respect to the example embodiment shown in FIGS. 1-6. For example, the similar to the embodiment shown in FIGS. 1-6, the male coupling 22 may be assembled with the male coupling housing 24 and the female coupling 42 may be assembled with the female coupling housing 44 via mechanical lock and receptor structures.

From the foregoing descriptions of various example embodiments, it will be apparent to persons skilled in the art that the male and female connector components 20, 40 and their respective male and female couplings 22, 42 and male and female coupling housings 24, 44 may be constructed in a wide variety of cross-sectional shapes depending on the desired application. For example, they may be formed as squares, rectangle, cylinders, octagons, ellipses, and many other shapes. Similarly, it will be apparent that the shape, number, and arrangement of male and female magnetic latching elements 56, 116 can be widely varied. For example, in addition to the example embodiments already shown, three, four or even more magnetic latching elements could be incorporated, depending on the size and cross-sectional shape of the male and female connector components and the desired application. Moreover, the magnetic latching elements could be arranged linearly, circularly, in multiple rows, and the like. Also similarly, the arrangement and number of electrically conductive pins 54 and sockets 112 can be widely varied. The pins and sockets can be arranged circularly, in a single row or in multiple rows, aligned or offset, and many other variations as desired for a particular application.

It will also be apparent from FIGS. 10-14 that in addition to the keying mechanisms shown and described in connection with the example embodiment of FIGS. 1-6 a variety of other keying mechanisms may be employed to ensure that the male and female connector components 20, 40 can be physically and electrically coupled only in a predetermined orientation. For example, in the example embodiment shown in FIGS. 10-11, the female coupling 42 has a rectangular notch-shaped opening 172 and an angled truncated corner 174 in the periphery of the opening into the recessed space 100 in which the sockets 112 and female magnetic latching elements 116*a*, 116*b* are recessed. The male coupling 22 has a corresponding rectangular notch 172*a* and an angled truncated corner 174*a*.

In the example embodiment shown in FIG. 12, several keying mechanisms are employed. The projecting outer housing 32 of the male coupling 22 has a substantially cylindrical cross-sectional shape but with one edge angled outwardly triangularly to a point. Similarly, the outer housing 98 and recessed space 100 of the female coupling 42 in which the electrically conductive sockets 112*c*, 112*d* and female magnetic latching element 11 are recessed are correspondingly shaped to receive the outwardly angled edge of outer housing 32 of the male coupling 22.

Similarly, in the example embodiment shown in FIGS. 13-14, the outwardly extending projection 166 of the male coupling 22 and the recessed space 168 of the female coupling have corresponding arcuate wing-like shapes so that the male and female connector components 20, 40 are able to be coupled in only one predetermined orientation.

H. Operation of Preferred Embodiment

Figure 3:
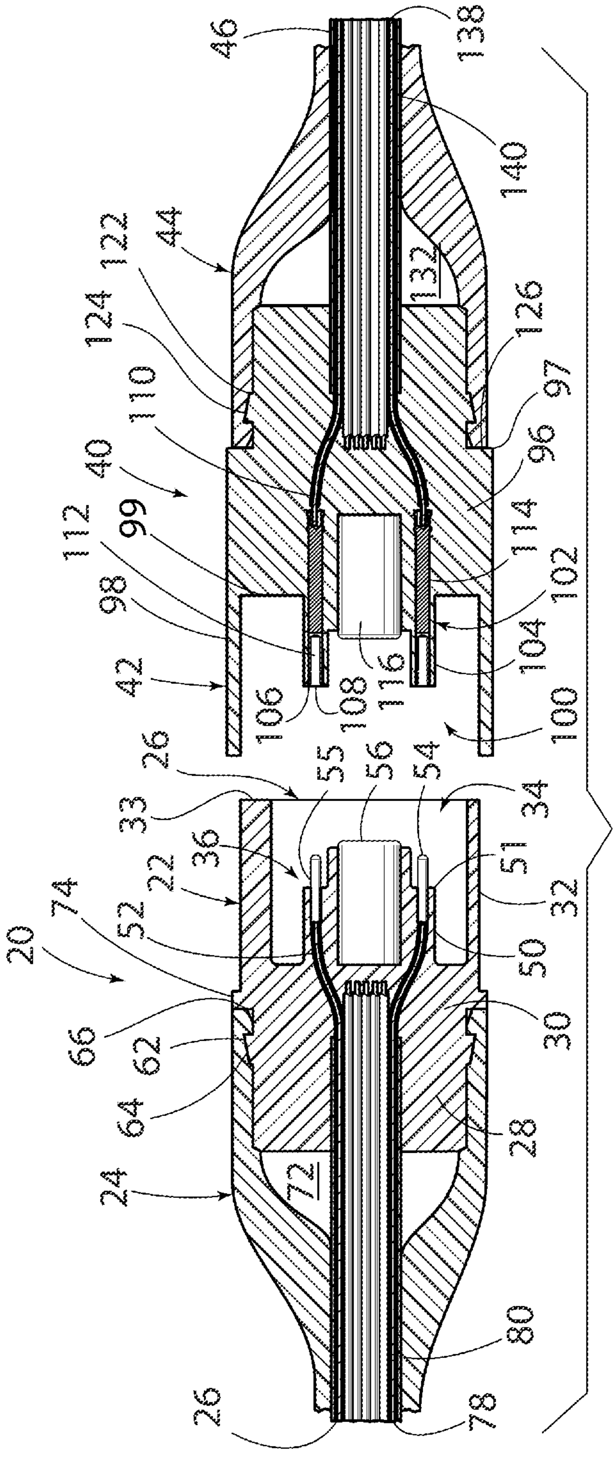
FIG. 3 is a cross-sectional side view of a magnetic latching connector with male and female components decoupled in accordance with an example embodiment.
Figure 4:
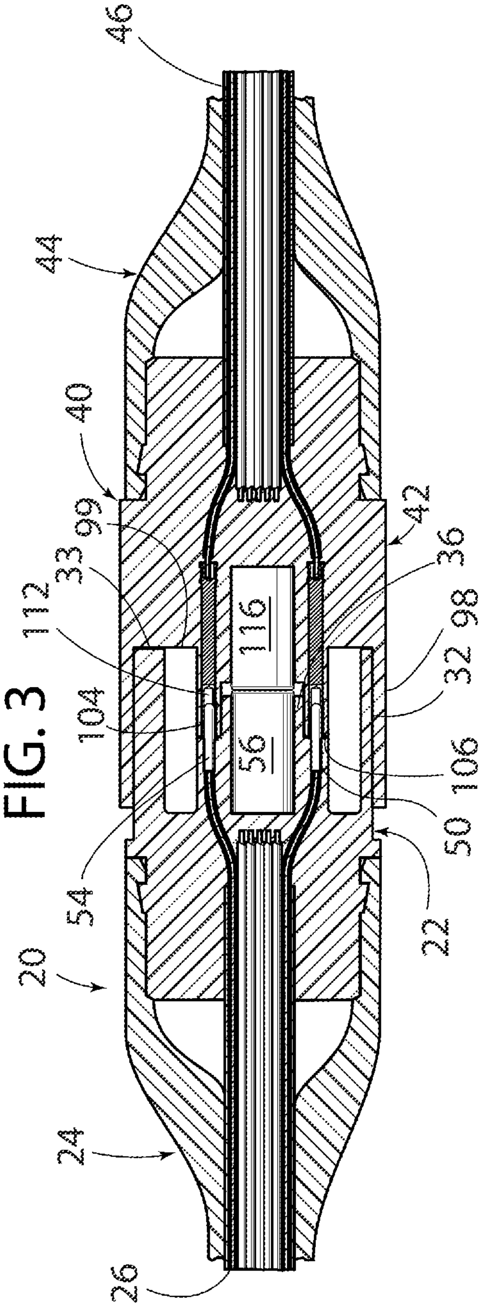
FIG. 4 is a cross-sectional side view of a magnetic latching connector with male and female components coupled in accordance with an example embodiment.

A preferred intended use of the invention is described below with reference primarily to the exemplary embodiment as illustrated in FIGS. 1 and 3-4. However, it will be understood by persons of ordinary skill in the art that the preferred use of the invention is essentially the same with respect to each exemplary embodiment described herein. Further, the preferred use of the invention does not depend on the particular shapes or configurations of the male and female connectors, the number, configuration, or characteristics of the corresponding pins and sockets of the male and female connectors, or the number, configuration or characteristics of the magnetic latching elements of the male and female connectors.

The following description of preferred intended use assumes the corresponding wires of the electrical cables 26, 46 that are desired to be electrically connected have been connected to the appropriate pins 54 and/or sockets 112 of the male and female couplings 22, 42 of the male and female connector components 20, 40 and the male and female connector components have been assembled in the manner described above.

In use, a male connector component 20 and corresponding female connector component 40 are brought into proximity. The pins of the male connector component are electrically connected to the wires of an end of a first electrical cable and the corresponding sockets of the female connector are electrically connected to the corresponding wires of an end of a second electrical cable as described above. The opposite end of the first cable may be connected to a source of electrical power and/or signals, or may be connected to a piece of equipment or a device that is to receive electrical power and/or signals. The opposite end of the second cable similarly may be connected to either a source or intended recipient of electrical power and/or signals. Alternatively, either or both opposite ends of the first and second cables also could be fitted with connectors adapted to be connected to yet other cables, or to intermediate devices such as switches or multiplexers. Also alternatively, either of the male or female connectors may be mounted on or in, or may be directly connected to, a source of electrical power and/or signals or to a piece of equipment or a device that is to receive electrical power and/or signals.

The male and female connector components 20, 40 are axially aligned. Further, if the male and female connector components 20, 40 have corresponding shapes, include corresponding guide structures, or have other keying mechanisms that allow the male and female connector components to be coupled only in a particular orientation, the connector components are first oriented accordingly. The male coupling housing 24 and female coupling housing 44 may be provided with ergonomic features to facilitate grasping and manually positioning the male and female connector components 20, 40.

The male connector is then inserted into the female connector with the pins of the male connector axially aligned with the corresponding sockets of the female connector, and the outwardly extending magnetic latching element(s) of the male connector axially aligned with the recessed receptacle(s) of the female connector. Preferably the male coupling 22 of the male connector component 20 is inserted into the female coupling 42 of the female connector component until the front end 26 of the male coupling 22 is substantially fully enclosed within the front end 98 of the female coupling 42. The male coupling 22 is inserted into the female coupling 42 until the vertical front face 33 of the forwardly projecting outer housing 32 of the male coupling 22 abuts against the recessed vertical wall 99 that marks the rearward extent of the recessed space 100 within the front end 98 of the female coupling 42. In this position, the vertical front face 51 of the shoulder of the forward projecting retaining structure 36 of the male coupling 22 that contains the pins 54 also abuts the front edge 106 of the annular projection 104 of the female coupling 42 that encloses the sockets 112. Thus, in this position the pins 54 of the male coupling 22 are fully seated within the corresponding sockets 112 of the female coupling 42. Further, the front face of the forward extending magnetic latching element 56 recessed within the housing 32 of the male coupling 22 is fully inserted within the corresponding recessed space formed by the annular projection 104 of the female coupling 42 in contact with the corresponding female magnetic element 116.

In this coupled position, the pins of the male connector component and the corresponding sockets of the female connector component are both physically and electrically connected. Thus, the wires of the cables 26, 46 to which the pins and corresponding sockets are connected are electrically connected. The magnetic latching elements 56, 116 exert an attractive magnetic force to maintain the physical and hence the electrical connection between the pins of the male connector component and the sockets of the female connector component. When it is desired to decouple the male and female connector components, and hence sever the electrical connection, the male and female connector components are simply grasped and pulled in opposite directions, preferably coaxially, with a force in excess of the combination of the magnetic attraction force of the magnetic latching elements 56, 116 and the pin retaining forces of the female sockets 112.

Unless otherwise defined, all technical and scientific terms used herein have the same meaning as commonly understood by one of ordinary skill in the art to which this invention belongs. Although methods and materials similar to or equivalent to those described herein can be used in the practice or testing of the magnetic latching connector, suitable methods and materials are described above. All publications, patent applications, patents, and other references mentioned herein are incorporated by reference in their entirety to the extent allowed by applicable law and regulations. The magnetic latching connector may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. An electrical connector, comprising:

a male connector having a male coupling end, a plurality of first electrically conductive elements within the male coupling end, and a plurality of second electrically conductive elements within the male coupling end, wherein the plurality of second electrically conductive elements are grouped separately from the plurality of first electrically conductive elements;

a first magnetic latching element within the male coupling end;

wherein the plurality of first electrically conductive elements are disposed around the first magnetic latching element;

a female connector having a female coupling end, a plurality of third electrically conductive elements within the female coupling end, a plurality of fourth electrically conductive elements within the female coupling end, and a cavity within the female coupling end;

a second magnetic latching element that is recessed within the cavity of the female coupling end;

wherein the plurality of third electrically conductive elements are disposed around the second magnetic latching element;

wherein the male connector and the female connector are adapted to be coupled together with the first magnetic latching element being received within the cavity of the female coupling end to directly magnetically interface with the recessed second magnetic latching element;

wherein the male connector and the female connector are to be coupled together with the plurality of first electrically conductive elements of the male connector electrically connected to the plurality of third electrically conductive elements of the female connector in a one to one relation and with the plurality of second electrically conductive elements of the male connector electrically connected to the fourth electrically conductive elements of the female connector in a one to one relation; and wherein the first magnetic latching element and the second magnetic latching element produce an attractive magnetic force between the male connector and the female connector.

2. The electrical connector of claim 1, wherein the male connector has a first longitudinal axis, wherein the female connector has a second longitudinal axis, wherein the first magnetic latching element is disposed within the male connector of the male connector substantially coaxially with the first longitudinal axis, and wherein the second magnetic latching element is disposed within the female connector substantially coaxially with the second longitudinal axis.

3. The electrical connector of claim 1, wherein the plurality of first electrically conductive elements are radially disposed around the first magnetic latching element and wherein the plurality of third electrically conductive elements are radially disposed around the second magnetic latching element.

4. The electrical connector of claim 1, wherein the female connector includes a space open at the female coupling end of the female connector and wherein the second magnetic latching element is within the space of the female connector.

5. The electrical connector of claim 1, wherein the male connector includes a space open at the male coupling end of the male connector and wherein the first magnetic latching element is within the space of the male connector.

6. The electrical connector of claim 1, wherein each of the plurality of first electrically conductive elements is comprised of a socket and wherein each of the plurality of third electrically conductive elements is comprised of a pin.

7. The electrical connector of claim 1, wherein each of the plurality of first electrically conductive elements is comprised of a pin and wherein each of the plurality of third electrically conductive elements is comprised of a socket.

8. The electrical connector of claim 1, wherein the first magnetic latching element is comprised of a magnet and the second magnetic latching element is comprised of a magnetic attractive material.

9. The electrical connector of claim 1, wherein the first magnetic latching element is comprised of a magnetic attractive material and the second magnetic latching element is comprised of a magnet.

10. The electrical connector of claim 1, wherein the first magnetic latching element is comprised of a magnet and the second magnetic latching element is comprised of a magnet.

11. The electrical connector of claim 1, wherein the female coupling end and the male coupling end each have a complimentary shape so that the male connector and the female connector can be coupled only in a predetermined orientation and wherein the complimentary shape is rectangular, elliptical, or octagonal.

12. The electrical connector of claim 1, wherein the plurality of first electrically conductive elements having a different sized cross-section from the plurality of second electrically conductive elements.

13. The electrical connector of claim 1, wherein the second magnetic latching element does not extend beyond the female coupling end of the female connector.

14. The electrical connector of claim 13, wherein the first magnetic latching element does not extend beyond the male coupling end of the male connector.

15. The electrical connector of claim 1, wherein the second magnetic latching element is recessed within the female connector.

16. The electrical connector of claim 15, wherein the first magnetic latching element is recessed within the male connector.

17. An electrical connector, comprising:

a male connector having a male coupling end, a plurality of first electrically conductive elements within the male coupling end, and a plurality of second electrically conductive elements within the male coupling end;

a first magnetic latching element within the male coupling end, wherein the first magnetic latching element does not extend beyond a front face of the male connector;

wherein the plurality of first electrically conductive elements are disposed around the first magnetic latching element;

a female connector having a female coupling end, a plurality of third electrically conductive elements within the female coupling end, a plurality of fourth electrically conductive elements within the female coupling end, and a cavity within the female coupling end that is divided into two spaces by a wall that separates the plurality of third electrically conductive elements from the plurality of fourth electrically conductive elements;

a second magnetic latching element that is recessed within the cavity of the female coupling end;

wherein the plurality of third electrically conductive elements are disposed around the second magnetic latching element;

wherein the male connector and the female connector are adapted to be coupled together with the first magnetic latching element being received within the cavity of the female coupling end to directly magnetically interface with the recessed second magnetic latching element;

wherein the male connector and the female connector are to be coupled together with the plurality of first electrically conductive elements of the male connector electrically connected to the plurality of third electrically conductive elements of the female connector in a one to one relation and with the plurality of second electrically conductive elements of the male connector electrically connected to the fourth electrically conductive elements of the female connector in a one to one relation;

wherein the first magnetic latching element and the second magnetic latching element produce an attractive magnetic force between the male connector and the female connector.

18. The electrical connector of claim 17, wherein each of the plurality of first electrically conductive elements is comprised of a socket and wherein each of the plurality of third electrically conductive elements is comprised of a pin.

19. The electrical connector of claim 17, wherein the plurality of first electrically conductive elements are radially disposed around the first magnetic latching element and wherein the plurality of third electrically conductive elements are radially disposed around the second magnetic latching element.

20. The electrical connector of claim 17, wherein the female coupling end and the male coupling end each have a complimentary shape so that the male connector and the female connector can be coupled only in a predetermined orientation and wherein the complimentary shape is rectangular, elliptical, or octagonal.

* * * * *